United States Patent
Li et al.

(10) Patent No.: US 10,477,595 B2
(45) Date of Patent: Nov. 12, 2019

(54) SYSTEM AND METHOD FOR RELAYING DATA OVER A COMMUNICATION NETWORK

(71) Applicants: Xu Li, Nepean (CA); Ngoc Dung Dao, Ottawa (CA)

(72) Inventors: Xu Li, Nepean (CA); Ngoc Dung Dao, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/457,998

(22) Filed: Mar. 13, 2017

(65) Prior Publication Data
US 2017/0273119 A1  Sep. 21, 2017

Related U.S. Application Data

(60) Provisional application No. 62/308,584, filed on Mar. 15, 2016.

(51) Int. Cl.
*H04W 76/10* (2018.01)
*H04W 8/08* (2009.01)
*H04W 12/04* (2009.01)
*H04W 88/04* (2009.01)

(52) U.S. Cl.
CPC .............. *H04W 76/10* (2018.02); *H04W 8/08* (2013.01); *H04W 12/04* (2013.01); *H04W 88/04* (2013.01)

(58) Field of Classification Search
CPC ......... H04W 76/10; H04W 8/08; H04W 8/24; H04W 12/04; H04W 76/02; H04W 48/02; H04W 88/04
See application file for complete search history.

(56) References Cited

U.S. PATENT DOCUMENTS

| | | | |
|---|---|---|---|
| 9,173,093 B2 | 10/2015 | Rishy-Maharaj et al. |
| 9,491,567 B2 | 11/2016 | Koo et al. |
| 2011/0038480 A1 | 2/2011 | Lin |

(Continued)

FOREIGN PATENT DOCUMENTS

| | | |
|---|---|---|
| CN | 104754575 | 7/2015 |
| CN | 104935375 | 9/2015 |

(Continued)

OTHER PUBLICATIONS

ZTE, "Relay selection and reselection, R2-152547", May 29, 2015 3GPP.*

(Continued)

*Primary Examiner* — Jae Y Lee

(57) ABSTRACT

A system and method for exchanging data with a network including an authorized UE that is authorized to exchange the data with the network, and an unauthorized UE that is not authorized to exchange the data with the network. The unauthorized UE operable to receive an authorization credential, and to exchange the data with the network using the received authorization credential. A system and method for exchanging data with a network including a requesting device and a relay UE. The relay UE operable to receive a transferable relay profile associated with the requesting device, and to establish a connection with the requesting device to relay data between the network and the requesting device based on the transferable relay profile.

20 Claims, 9 Drawing Sheets

(56) References Cited

U.S. PATENT DOCUMENTS

| | | | |
|---|---|---|---|
| 2011/0305339 A1* | 12/2011 | Norrman | H04W 12/04 |
| | | | 380/270 |
| 2013/0183971 A1 | 7/2013 | Tamaki et al. | |
| 2014/0146757 A1 | 5/2014 | Liao et al. | |
| 2014/0286216 A1 | 9/2014 | Park et al. | |
| 2014/0310782 A1 | 10/2014 | Vanderveen et al. | |
| 2015/0012744 A1 | 1/2015 | Chen et al. | |
| 2015/0163840 A1 | 6/2015 | Ji et al. | |
| 2015/0312758 A1 | 10/2015 | Redford et al. | |
| 2016/0309328 A1 | 10/2016 | Zhang et al. | |
| 2016/0337853 A1 | 11/2016 | Abdulrahiman | |
| 2016/0353307 A1* | 12/2016 | Jung | H04W 8/005 |
| 2018/0152234 A1* | 5/2018 | Huang | H04W 36/06 |

FOREIGN PATENT DOCUMENTS

| | | |
|---|---|---|
| EP | 2833694 | 2/2015 |
| JP | 2007241720 A | 9/2007 |
| JP | 2015149724 A | 8/2015 |
| JP | 2016540420 A | 12/2016 |
| WO | 2010030020 A1 | 3/2010 |
| WO | 2012079629 | 6/2012 |
| WO | WO 2012/079629 * 6/2012 | ............ H04W 24/02 |
| WO | 2015059286 A1 | 4/2015 |
| WO | 2016010760 A1 | 1/2016 |

OTHER PUBLICATIONS

International Search Report dated May 22, 2017 for corresponding International Application No. PCT/CN2017/076600 filed Mar. 14, 2017.

International Search Report dated May 22, 2017 for corresponding International Application No. PCT/CN2017/076651 filed May 31, 2017.

Huawei Technologies Co., Ltd., U.S. Appl. No. 15/457,938, filed Mar. 13, 2017, entitled "System and Method for Relaying Data Over a Communication Network"—Not Yet Published.

XP050972112 R2-152462 Ericsson,"Signalling required for UE-NW relay selection",3GPP TSG-RAN WG2 #90, Fukuoka, Japan, May 25-29, 2015,total 17 pages.

ZTE,"Relay selection and reselection",3GPP TSG RAN WG2 #90 R2-152547,Fukuoka, Japan, May 25-29, 2015, total 4 pages.

* cited by examiner

SYSTEM AND METHOD FOR RELAYING DATA OVER A COMMUNICATION NETWORK

CROSS-REFERENCE TO RELATED APPLICATIONS

This application claims priority from U.S. Patent Application No. 62/308,584, filed Mar. 15, 2016, and entitled "SYSTEM AND METHOD FOR relaying data OVER A COMMUNICATION NETWORK" the entirety of which is incorporated herein by reference.

FIELD OF THE INVENTION

The present invention pertains to the field of communication networks and in particular to a system and method for User Equipment (UEs) to communicate over a communication network. In an implementation, the present invention more particularly relates to a system and method for UEs to relay data over a communication network including to transfer a relay profile between relaying UEs.

BACKGROUND

In third and fourth generation (3G/4G) communication networks (e.g. High Speed Packet Access (HSPA) and Long Term Evolution (LTE) networks), each UE has its own credential, or set of credentials, that is used by network entities to identify and authorize the UE to connect to the network. If a UE was not registered on a network, for instance a specific carrier's wireless network, then it is not able to send or receive information over the network. In some instances, a UE without credentials to a network can still be authorized for unauthenticated access to emergency services, for the sake of simplicity, this type of access will be referred to as emergency access, and other forms of access will be simply referred to as access. Accordingly, in order to provide connectivity to a UE on a network, that UE must have an identity module that allows registration of its communications module (e.g. modem and transceiver) for operation on the network.

The functional limitation of this arrangement is that for a UE to receive information over the network must have its own communications module that has been registered for operation on the network. When a first UE is not registered for a network or is otherwise unable to access the network, and has traffic to be communicated using the otherwise inaccessible network, it can connect to a second UE that is registered for access to the network in question. The second UE can provide access to the network in question by acting as a gateway for the first UE. In such as scenario, all data traffic from the first UE passes through the second UE and is treated as data traffic originating at the gateway UE. Typically, the connection between the first and second UEs makes use of a different radio access technology than the network connection (e.g. a UE connecting to a Long Term Evolution (LTE) network may act as a WiFi Access Point to provide network access to other UEs). It is envisioned that in some next generation radio access networks (e.g. so called Fifth Generation (5G) networks), UEs may be able to act as relays for other UEs, and the relay UE may not be subject to bearing the charges associated with the data exchanged on behalf of the first UE, if the first UE, or a service accessed by the first UE, has agreed to bear the cost.

This arrangement limits connectivity to networks to cases where the two UEs are owned, or closely associated with one another, such that the user of the gateway UE is willing to assume responsibility, and pay the incurred charges, for data associated with the first UE. It also requires explicit actions to be taken by the user of the gateway UE (e.g. activation of a Wi-Fi hotspot function).

There is a need for a system and method for allowing more flexible communication over a network. In some implementations, there is a need for a system and method that allows for the relaying of data over a network. In some implementations, there is a need for a system and method that allows for handing over a relay operation from one UE to another UE.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

In an embodiment, a method is provided for exchanging data with a network. The method including: receiving, at a network controller, from a relay UE, a transferable relay profile associated with a relay connection between a requesting device and the network; and, transmitting the transferable relay profile to a second relay UE.

In an implementation, the method further includes transmitting an instruction to the relay UE to start a transfer of the relay profile prior to receiving the transferable relay profile. The transmitting the transferable relay profile may be performed in response to a relay transfer decision determined in accordance with status information associated with at least one of the relay UE, the second relay UE, and the requesting device.

In an implementation, the method further includes generating signature generation keys; and, transmitting the generated signature generation keys to the second relay UE for use with the transferable relay profile.

In an implementation, the method further includes generating updated signature verification keys; and, transmitting the updated signature verification keys to the requesting device.

In an embodiment, a method is provided for a relay UE to exchange relay data with a network. The method may include: establishing, at the relay UE, a relay connection between a requesting device and the network using a transferable relay profile; receiving, at the relay UE, an instruction to transfer the transferable relay profile; and, transmitting, from the relay UE, the transferable relay profile.

In an implementation, the transferable relay profile is transmitted to one of a second relay UE and a network controller.

In an implementation, the instruction is received from the requesting device.

In an implementation, the instruction is received from a network controller.

In an embodiment, a network controller is provided. The network controller available on a network and including: a processor; a network interface; a non-transitory memory for storing instructions that when executed by the processor cause the UE, responsive to receipt from a relay UE a transferable relay profile associated with a relay connection between a requesting device and the network, to: transmit the transferable relay profile to a second relay UE.

In an implementation, the non-transitory memory stores further instructions that when executed cause the network controller to: transmit to the relay UE an instruction to start relay profile transfer, prior to receiving the transferable relay profile.

In an implementation, the non-transitory memory stores further instructions that when executed cause the network controller to: before the transmitting the instruction to start relay profile transfer, monitor UE status information of at least one of the relay UE, the second relay UE, and the requesting device; and, to transmit the instruction to start relay profile transfer based on the monitored UE status information.

In an implementation, the non-transitory memory stores further instructions that when executed cause the network controller to: generate signature generation keys; and, transmit the generated signature generation keys to the second relay UE for use with the transferable relay profile.

In an implementation, the non-transitory memory stores further instructions that when executed cause the network controller to: generate updated signature verification keys; and, transmit the updated signature verification keys to the requesting device.

In an embodiment, a User Equipment (UE) is provided. The UE including: a processor; a radio access network interface; a non-transitory memory for storing instructions that when executed by the processor cause the UE to: establish at the UE a relay connection between a requesting device and the network using a transferable relay profile; receive at the UE an instruction to transfer the transferable relay profile; and, transmit from the UE the transferable relay profile to a second relay UE.

In an implementation, the transferable relay profile is transmitted to one of a second relay UE and a network controller.

In an implementation, wherein the instruction is received from the requesting device.

In an implementation, wherein the instruction is received from a network controller.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE INVENTION

Figure 1:
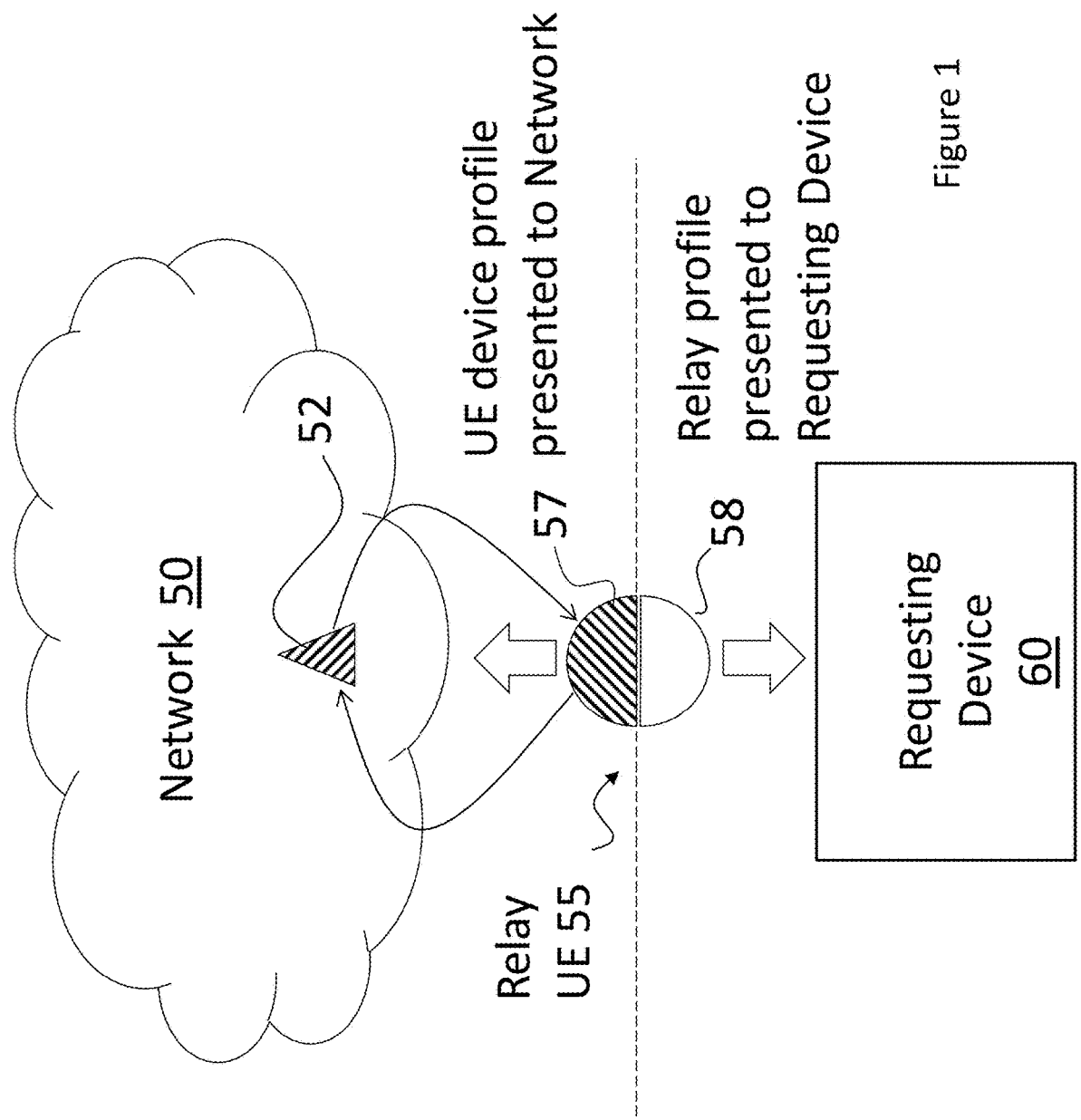
FIG. 1 illustrates a system and method for relaying data.

The present application relates to a system and method for providing alternative connectivity to a network. In particular, the present application relates to a system and method for relaying data to a network. In some implementations, the present applications to a system and method for handing over a relay operation from one UE to another UE.

In some proposed networks, such as next generation networks including proposed 5G networks, there may be additional flexibility in handling the identity of connected UEs, as well as for providing new modes of connectivity for non-connected UEs. In the following description and accompanying Figures a UE in the form of a wireless-enabled mobile communications device such as a smartphone, denoted by User Equipment (UE), is used for illustrative purposes only. It is understood and intended that the present application provides a system and method applicable to a range of electronic devices including UEs, autonomous machines and other devices that connect to a mobile network. The term "UE" is used for simplicity but should be understood to also refer to electronic devices that connect to a wireless network, User Equipment (UE) as defined under the 3GPP standards, fixed wireless terminals, and other such devices that make use of a wireless network connection. The term "requesting device" is used herein to describe a computing device that requires the assistance of a UE to gain access to a network. The requesting device may be a UE, or may be a non-connected electronic device, such as an IoT device, that relies upon a relay UE to access the network.

In an implementation, the unauthorized UE may assume relay responsibilities from the authorized UE, and may receive the authorization credential of a third party device and use the authorization credential to relay data on behalf of the third party device to the network.

In an implementation, a relay UE may receive a transferable relay profile, and the relay UE may use the transferable relay profile to transfer data with a network on behalf of a requesting device associated with that transferable relay profile. In an implementation, a relay UE may generate a transferable relay profile, and the relay UE may use the transferable relay profile to transfer data with a network on behalf of a requesting device associated with that transferable relay profile. In some embodiments, there may be two UEs that are both authorized to access a radio access network. When one of these UEs is acting as a relay for other requesting devices, it can characterize the mechanism it uses to provide this relay service as a set of parameters in a relay profile. It is then possible to provide an orderly transition of the connected devices to the second UE by transmitting the relay profile to the second UE. The second UE can then begin offering relay service in accordance with the transferred relay profile. With some coordination (which may take the form of instructions transmitted along with the transferrable relay profile), the second UE can seamlessly replace the first UE in a process that may be transparent to the requesting devices. In some embodiments, the transfer of a relay profile may include the transfer of an authentication credential to allow the second UE to connect to the network under the auspices of the first UE.

In an implementation, a system may be provided that is operable to detect a location of an authorized first UE providing relay operations and to limit a validity of the authorization credential enabling the relay operations to a limited geographical zone or area. In some embodiments, the limited geographical zone may be based in a relation with the detected location, such as a distance from the detected location. In some embodiments, the limited geographic area may be specified using geographic coordinates, geographic landmarks, etc. In an implementation, the system may be operable to detect a location of an authorized first UE providing relay operations and to initiate a relay profile transfer from the first UE to a second UE on the basis of the location coinciding with a limited geographical zone about a third requesting device that is currently receiving relay assistance from the authorized first UE to gain connectivity to the network.

In the following description and accompanying figures a UE in the form of a wireless-enabled mobile communications UE such as a smartphone, denoted by User Equipment (UE), is used for illustrative purposes only.

Referring to FIG. 1, an embodiment of a system and method for relaying data is presented. In the exemplary embodiment, a relay UE 55, such as User Equipment (UE), provides connectivity for a requesting device 60 to a network 50. The requesting device 60 may be an electronic device that requires assistance gaining access to the network 50. In some implementations, the requesting device 60 may be a UE that ordinarily has direct connectivity, such as a smartphone, but it is advantageous in the circumstances to rely upon the connectivity of the relay UE 55. The requesting device 60 may be a massive Internet of Things (mIoT) device such as an IoT gateway, utility meter, car computer, or sensor that may be reliant on connected UEs to access the network 50, or may be a mIoT gateway that provides connectivity for other UEs. A base station 52 in the network 50 acts as the authenticating party of the network 50.

In a typical implementation, a UE 55 may register itself with the network 50, for instance through the base station 52, as willing and able to act as a relay. At this point, UE 55 will be referred to as a relay UE. Upon registration, the base station 52 may assign and forward a relay profile 58 to the relay UE 55. In one embodiment, the base station 52 may assign a relay profile 58 to the requesting device 60, but not forward the relay profile 58 to the relay UE 55 until a later time.

In another embodiment, the relay profile 58 may be generated by one of the requesting device 60 and the relay UE 55, for instance as part of an initial handshake procedure between the requesting device 60 and the relay UE 55. An example application of the alternate implementation would be an implementation where the requesting device 60 may spontaneously establish a relay connection using the relay UE 55 to gain access to the network 50.

In some embodiments, instead of the network 50 associating the relay profile 58 with the requesting device 60, the relay UE 55 may maintain the association between the relay profile 58 and the requesting device 60. In order to transfer the relay profile 58, the current relay UE 55 may forward the relay profile 58 directly to a new relay UE. This direct transfer of the relay profile allows the transfer of the profile without involvement of the network 50. In other embodiments, the current relay UE 55 can forward the relay profile 58 to a node within the network 50 in response to a request to transfer the relay profile 58. Accordingly, in this implementation the network 50 would only associate the relay profile 58 with the requesting device 60 once it had been received from the relay UE 55.

In other embodiments, the relay profile 58 may be generated by the network 50 and/or the relay UE 55 and maintained at the relay UE 55. The relay profile 58 may include a set of parameters used by the relay UE 55 in providing the relay service. A requesting device 60 may discover that relay UE 55 is a UE in range and available to provide relay service for a network service applicable to the requesting device 60. After the discovery, the requesting device 60 may subscribe to the relay UE 55. In a scenario where the relay profile 58 is associated with the relay UE 55, the relay profile 58 can be updated to include any parameters associated with how service is provided to requesting device 60. In a scenario in which the relay profile 58 is associated with the requesting device 60, the parameters characterizing how relay UE 55 provides service to requesting device 60 can be assigned to the relay profile 58. After the assignment, the relay profile 58 may be transferred by the relay UE 55 to the network 50 or another relay UE in order to maintain relay connectivity for the requesting device 60.

The relay profile 58 can be considered as defining a virtual relay service with the requesting device 60. The virtual relay service may be transferred to different UEs by transferring the transferable relay profile 58. Upon receipt of relay profile 58, a second UE would be able to provide relay services to the requesting device 60. If both the first and second relay UEs have the same capabilities, this transfer may be transparent to requesting device 60. The relay profile 58 may define parameters that characterize the physical connection between the relay UE 55 and the requesting device 60 including, for instance: a Service Set IDentifier (SSID) (also known as a wi-fi network name); a UE ID (for allowing personal area networking protocols, such as Bluetooth, to characterize the connection); LTE parameters (such as cell ID, MIB), access policy, protocol stack, connection context, session context, etc. The relay profile 58 may provide a virtual identifier, and in some implementations a virtual security credential, to be used by the relay UE 55 in place of an actual UE identifier when it connects to a network. In some embodiments, a virtual security credential may be provided along with other information sufficient for the relay UE 55 to adopt a position as an authorized correspondent in a relay service with the requesting device 60. Accordingly, the relay profile 58 allows a replacement relay UE to step into a relay connection between the requesting device 60 and the network 50 to replace relay UE 55 in a manner that may be transparent to the requesting device 60. In some implementations, the network 50 and/or the relay UE 55 may update one or more security credentials with the requesting device 60 as part of establishing the relay service with the relay UE 55. The updating of the one or more security credentials ensures that UEs that may have previously relayed communications on behalf of the requesting device 60 are no longer authorized to take part in the relay service. In another embodiment, the relay profile may include information that allows a replacement relay UE to connect to the requesting device 60 to provide the requesting device 60 with a profile for connecting to the replacement relay UE.

The relay profile 58 may further include information relating to services supported by the network 50 relevant to a relay service defined by the relay profile 58. For instance, the relay profile 58 may define a geographic area over which the relay service is to be supported, or the service connections on the network covered by the relay service.

In an embodiment of the implementation depicted in FIG. 1, the relay UE 55 may establish separate connections between each of basestation 52 in network 50 (or other nodes within or accessed through network 50) and the requesting device 60 to create the relay service defined by the relay profile 58. In order to define the connections, the relay UE 55 may implement the UE profile 57 defining the connection between the relay UE 55 and the base station 52 of the network 50, and the relay profile 58 defining the transferable connection between the relay UE 55 and the requesting device 60. The requesting device 60 may utilise an existing connection profile that was previously established with the network 50 to communicate with the relay UE 55 under the relay profile 58. The existing connection profile corresponding to the relay profile 58 adopted by the relay UE 55. In some implementations, the relay profile 58 is transferable between the relay UE 55 and another UE, but the UE profile 57 is independent from the relay profile 58, and established by, each UE. In some implementations, the UE profile 57 may be transferable with the relay profile 58. In some implementations, the UE profile 57 is a device-specific profile unique to each relay UE 55.

In another embodiment, a function within network 50 (e.g. an authentication server function (AUSF) or other such network function) may be operative to maintain the relay service, by generating and maintaining a relay profile 58 for each requesting device 60 that needs to access a service on the network 50. This profile 58 can be transmitted by the network to any UE acting as relay UE 55 for the requesting device 55

The relay profile 58 may be retained by the relay UE 55 even after it has disconnected from the requesting device 60. A new relay connection may be established spontaneously by the relay UE 55 at a later time using the existing retained relay profile 58.

The relay UE 55 may, in some embodiments, communicate with the requesting device 60 using a first radio access technology and the relay UE 55 may communicate with the network 50 using a second radio access technology. In this implementation, the first radio access technology may be a short-range modality in comparison to the second radio access technology. For instance, the first radio access technology may by a Wi-Fi or a Bluetooth connection, while the second radio access technology may be cellular connection. It is understood, however, that the range of the first radio access technology could be the same as, or further than, the range of the second radio access technology depending upon specific network needs.

Figure 2:
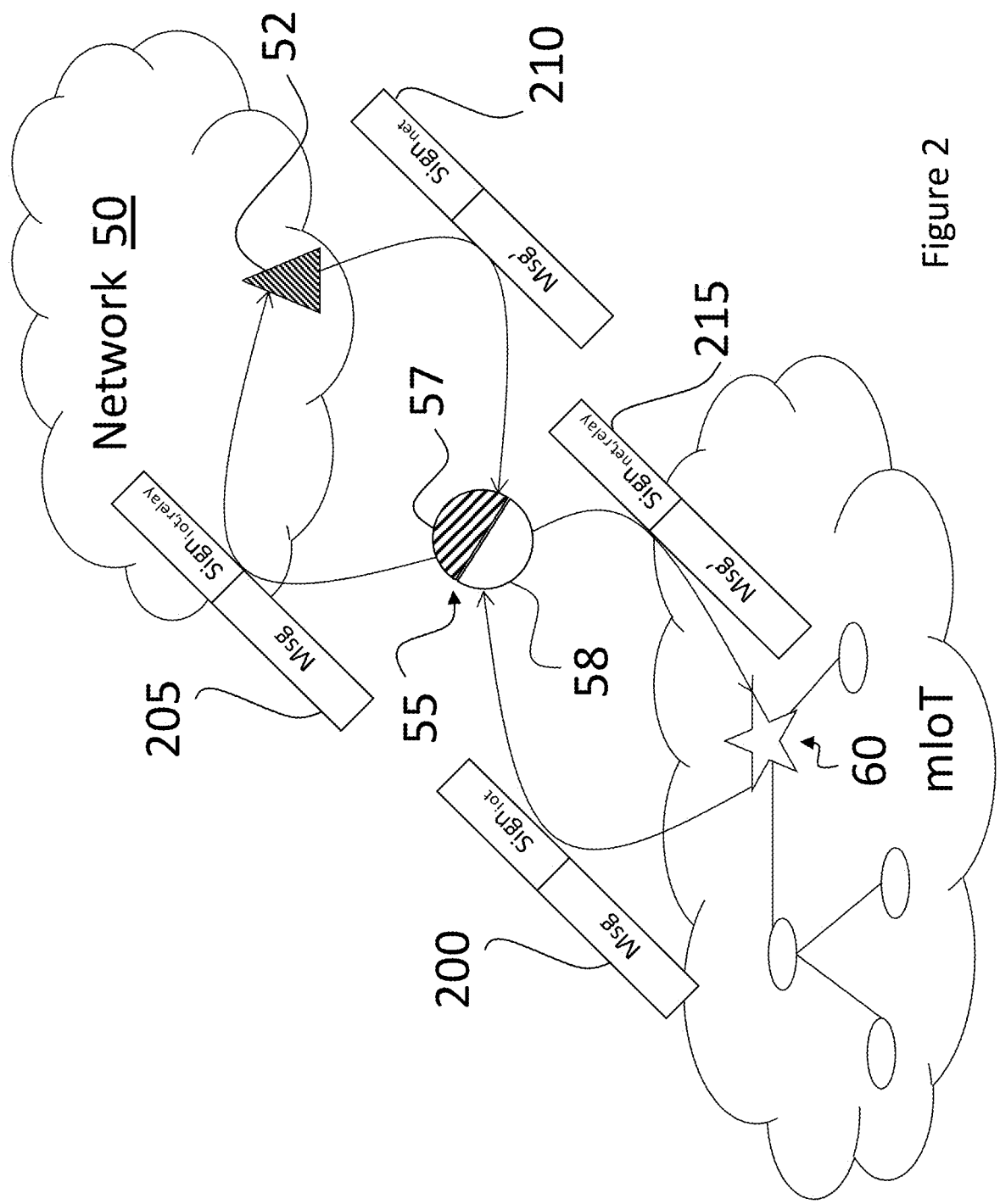
FIG. 2 illustrates a system and method for establishing a secure connection for relaying data.

As illustrated in FIG. 2, a connection across the relay UE 55 may be established by exchanging a set of uplink and downlink authentications. In some embodiments, this connection can be secured. The exchange of authentication information can be initiated by the requesting device 60. In other embodiments, the exchange could be initiated by the base station 52 or another network node. A first step 200 is that an originating device, in this example requesting device 60, sends an initiating message (Msg) that includes an initiating message signature ($sign_{iot}$) associated with the requesting device 60. This initiating message is sent to relay UE 55. Relay UE 55 may process the received initiating message and the associated initiating message signature of the requesting device 60 in accordance with relay profile 58. The relay UE 55 may then further authenticate the received initiating message using the relay profile 58 and in step 205 send the message and authenticated initiating message signature ($sign_{iot, relay}$) to the base station 52. The base station 52 may process the message and the authenticated initiating message signature to confirm an authenticity of the initiating message and signatures. This processing may include interacting with other entities within network 50, such as an Authentication Server Function (AUSF).

The relay UE 55 may establish a bifurcated message signing scheme with the network 50, such that communications between the requesting device 60 and the relay UE 55 are processed by the relay UE 55 using the relay profile 58, and communications between the network 50 and the relay UE 55 are processed by the relay UE 55 using the UE profile 57. Accordingly, in this implementation the signature scheme between the relay UE 55 and the requesting device 60 may be maintained under, and transferred with, the relay profile 58, while the signature scheme between the relay UE 55 and the network 50 may be maintained under the UE profile 57 and remain with the relay UE 55 and not be transferred when the relay profile 58 is transferred.

Assuming that the message and signature are authenticated, the base station 52, in step 210 transmit a response message (Msg') and response message signature ($sign_{net}$) of the base station 52 to the relay UE 55. Those skilled in the art will appreciate that in some embodiments, the authentications and even the generation of the response message may be performed by other network nodes. Relay UE 55 may process the received response message and response message signature using the relay profile 58. The relay UE 55 may then further co-sign the received initiating message using the relay profile 58 and in step 215 send the response message and authenticated response message signature ($sign_{net, relay}$) to the requesting device 60. The requesting device 60 may process the response message and the authenticated response message signature to confirm an authenticity of the response message and signatures.

In some implementations, the relay UE 55 may further provide an access control function by evaluating an identity of the requesting device 60 to determine whether it has permission to access the network 50. For instance, the relay UE 55 may refer to an access credential such as a blacklist, a whitelist, or a certificate list in order to confirm that the requesting device 60 has permission to access the network 50. The access control function may be defined by the relay profile 58.

Confidentiality of communications may be maintained at two levels. While each of the two levels are optional, typical implementations will likely take advantage of using both levels concurrently to ensure communication security between the UEs as well as from third party UEs. In a first application level, the network 50 and the requesting device 60 may establish data encryption between the network 50 and the requesting device 60 such that all underlying data relayed by the relay UE 55 is encrypted by the requesting device 60 rendering it unreadable by the relay UE 55. In a second relay level, the requesting device 60 and the relay UE 55 may establish relay encryption between the requesting device 60 and the relay UE 55 under the relay profile 58, and separately the relay UE 55 and the base station 52 may establish UE encryption between the relay UE 55 and the requesting device 60 under the UE profile 57. In this fashion, separate encrypted communication links may be established between each of the requesting device 60 communicating with the relay UE 55, and between the relay UE 55 communicating with the base station 52. In other implementations, only one of the relay encryption and the UE encryption may be implemented.

Accordingly, data of the requesting device 60 may be protected from review by the relay UE 55, the communication between the requesting device 60 and the relay UE 55 may be separately protected under the relay encryption, and communication between the relay UE 55 and the base station 52 may be separately protected under the UE encryption. The relay encryption and the UE encryption may comprise a common cryptographic scheme or, preferably, may comprise separate cryptographic schemes. The encryption may comprise symmetric or asymmetric cryptography, as is known in the art.

In an implementation, the requesting device 60 may establish a signature generation key: $K_{iot}^g$, and signature verification keys: $K_{net}^v$, $K_{relay}^v$. The relay UE 55 may establish a signature generation key: $K_{relay}^g$, and the base station 52 may establish a signature generation key: $K_{net}^g$, and signature verification keys: $K_{iot}^v$, $K_{relay}^v$. In an optional implementation, the relay UE 55 may further establish signature verification keys: $K_{net}^v$, $K_{iot}^v$, to verify communications received from the base station 52 and the requesting device 60.

Figure 3:
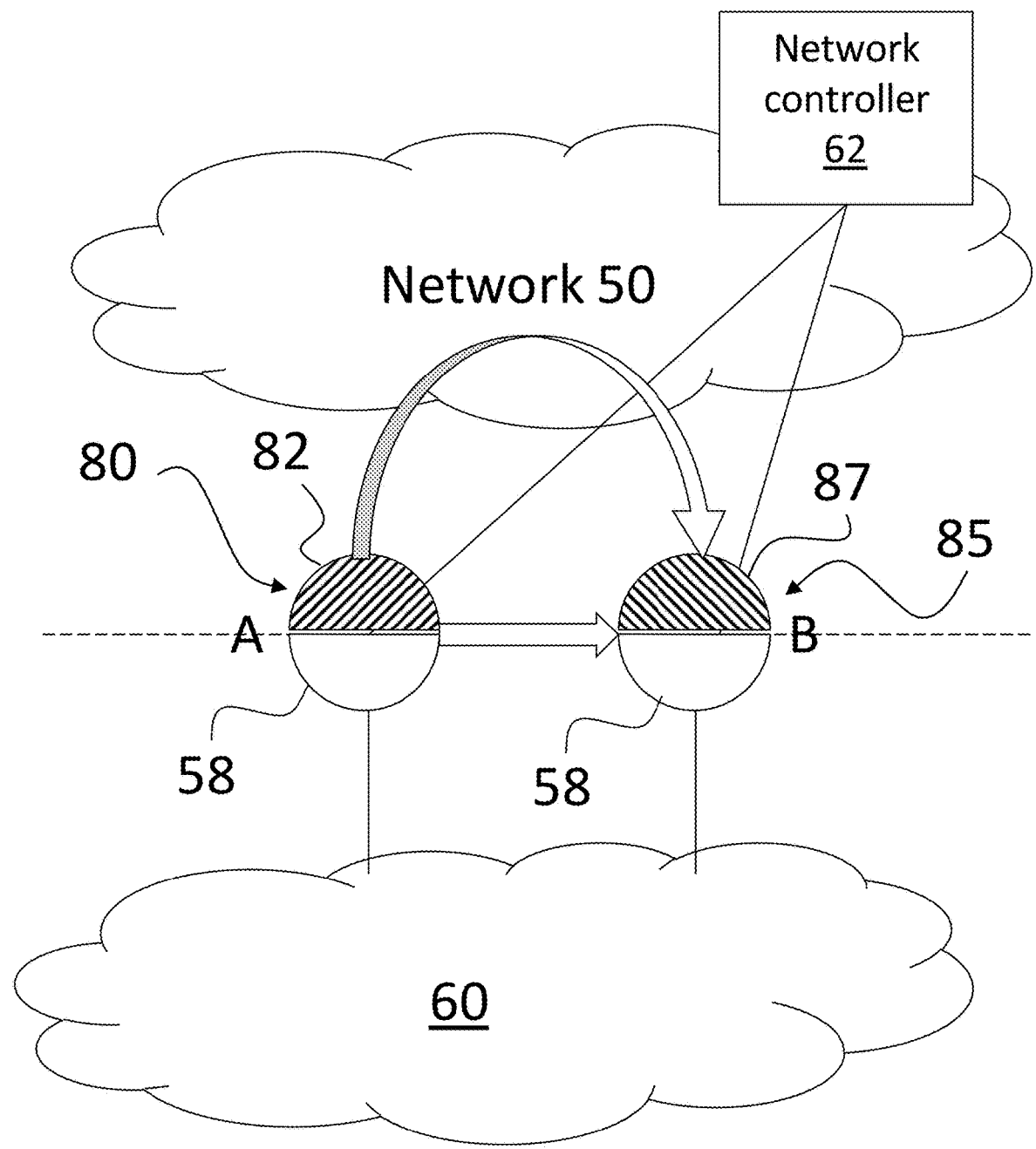
FIG. 3 illustrates a system and method for transferring a relay service from a first UE to a second UE.

Referring to FIG. 3, in an implementation the relay profile 58 may be transferred from a first relay UE A 80 to a second relay UE B 85 to allow the second relay UE B 85 to assume connection responsibilities for the requesting device 60. Transferral of the relay profile 58 may also transfer the access credential to the second relay UE B 85, allowing the second relay UE B 85 to further assume access control responsibilities under the transferred relay profile 58.

In an implementation, the transfer of the relay service may be controlled by a network controller 62 in the network 50. In an implementation, the network controller 62 may comprise the base station 52. In operation, the network controller 62 monitors the operational states of the first relay UE A 80 and the second relay UE B 85. When necessary and appropriate, the network controller 62 may inform both of the first relay UE A 80 and the second relay UE B 85 about the transfer of the relay service.

In an implementation, the transfer may comprise the network controller 62 transferring the relay profile 58 from the first relay UE A 80 to the second relay UE B 85. In an implementation, the relay profile 58 may be transferred directly from the first relay UE A 80 to the second relay UE B 85 with, or without, the assistance of the network controller 62.

The transfer may optionally also include updating the cryptographic keys to establish a new secure connection between the requesting device 60 and the network 50. The transfer may further optionally also include the cancellation of an existing first UE profile 82 established for the first relay UE A 80 to communicate with the network 50, and the creation of a second UE profile 87 to allow the second relay UE B 85 to communicate with the network 50.

Figure 4:
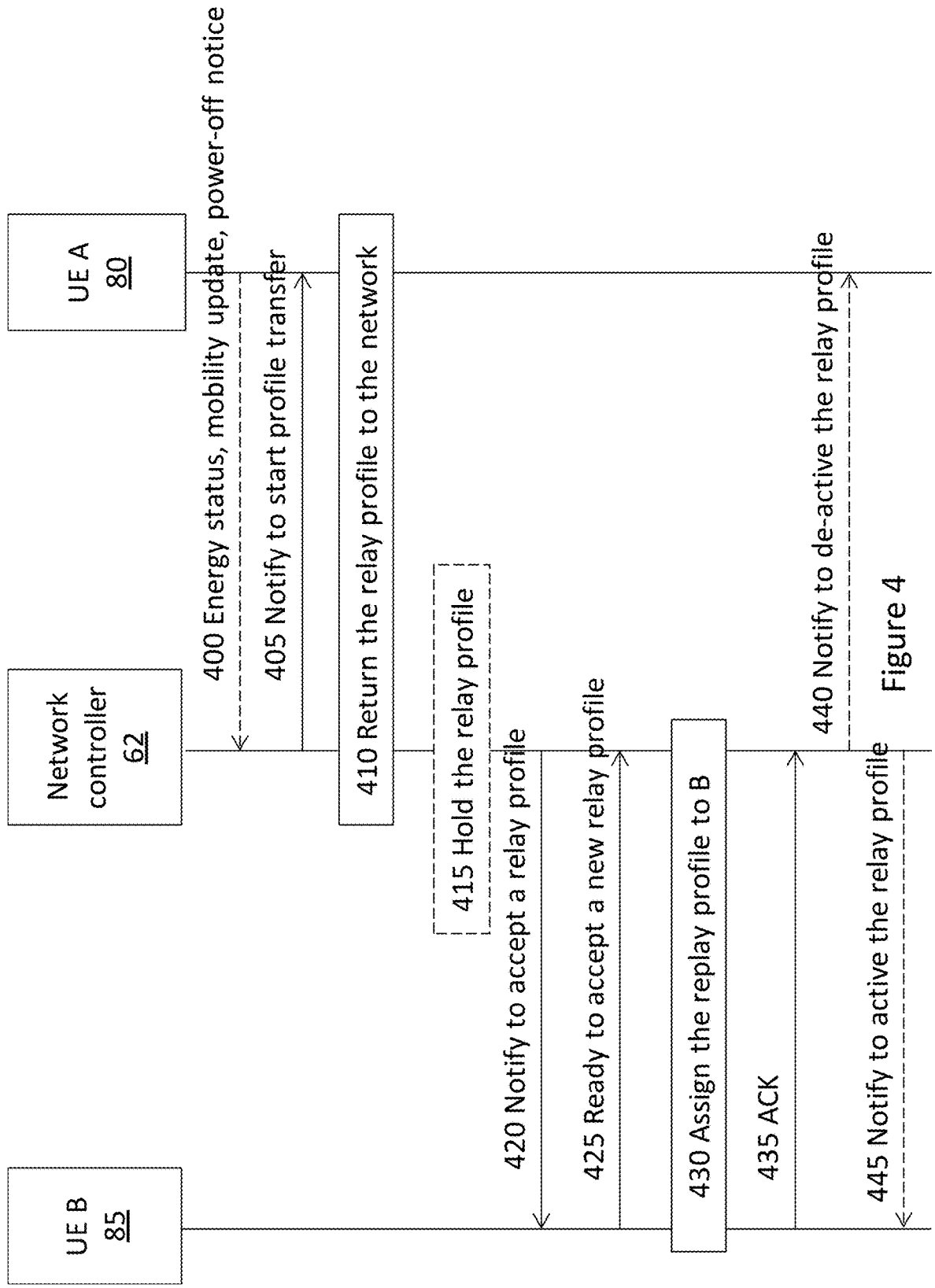
FIG. 4 is a signaling diagram illustrating the signaling for a network controller to inform the UEs of the relay service transfer, in an embodiment.

Referring to FIG. 4, a signaling diagram is illustrated detailing the signaling for the network controller 62 informing the first relay UE A 80 and the second relay UE B 85 of the transfer, and assisting with the transfer of the relay profile 58 from the first relay UE A 80 to the second relay UE B 85. In the example of FIG. 4, the network controller 62 handles the cancellation of the relay service handled by the first relay UE A 80. In optional step 400, the network controller 62 may receive UE status information from at least one of the first relay UE A 80, the second relay UE B 85, and the requesting device 60. FIG. 4 only indicates the embodiment of the first relay UE A 80 providing UE status information. The UE status information may include, for instance, energy status, mobility update, and/or a power off notice. In step 405, optionally based on the UE status information provided in step 400, the network controller 62 transmits a notification to the first relay UE A 80, instructing the first relay UE A 80 to transfer the relay profile 58. In step 410 the first relay UE A 80 returns the relay profile 58 to the network controller 62. In optional step 415, the first relay UE A 80 may hold the relay profile 58 for a period of time. In step 420, the network controller 62 transmits to the second relay UE B85 a notification to accept the relay profile 58. In step 425, the second relay UE B 85 transmits a confirmation that it is ready to receive the relay profile 58. In step 430, the network controller 62 assigns and transfers the relay profile 58 to the second relay UE B 85. The assignment may include, for instance, processing the relay profile 58 to establish a new cryptographic connection between the requesting device 60, the second relay UE B 85 and the network 50. In step 435, the second relay device B 85 may transmit an acknowledgment of the relay profile assignment to the network controller 62. In optional step 440, the network controller 62 may notify the first relay UE A 80 that its relay service has been cancelled and instruct the first relay UE A 80 to de-activate the associated relay profile 58. In optional step 445, the network controller 62 may notify the second relay UE B 85 that its relay service has been activated and that it should activate the associated relay profile 58 with the requesting device 60. In an alternative implementation, the assignment in step 430 may include the notification instructing the second relay UE B 85 to activate the relay service.

Figure 5:
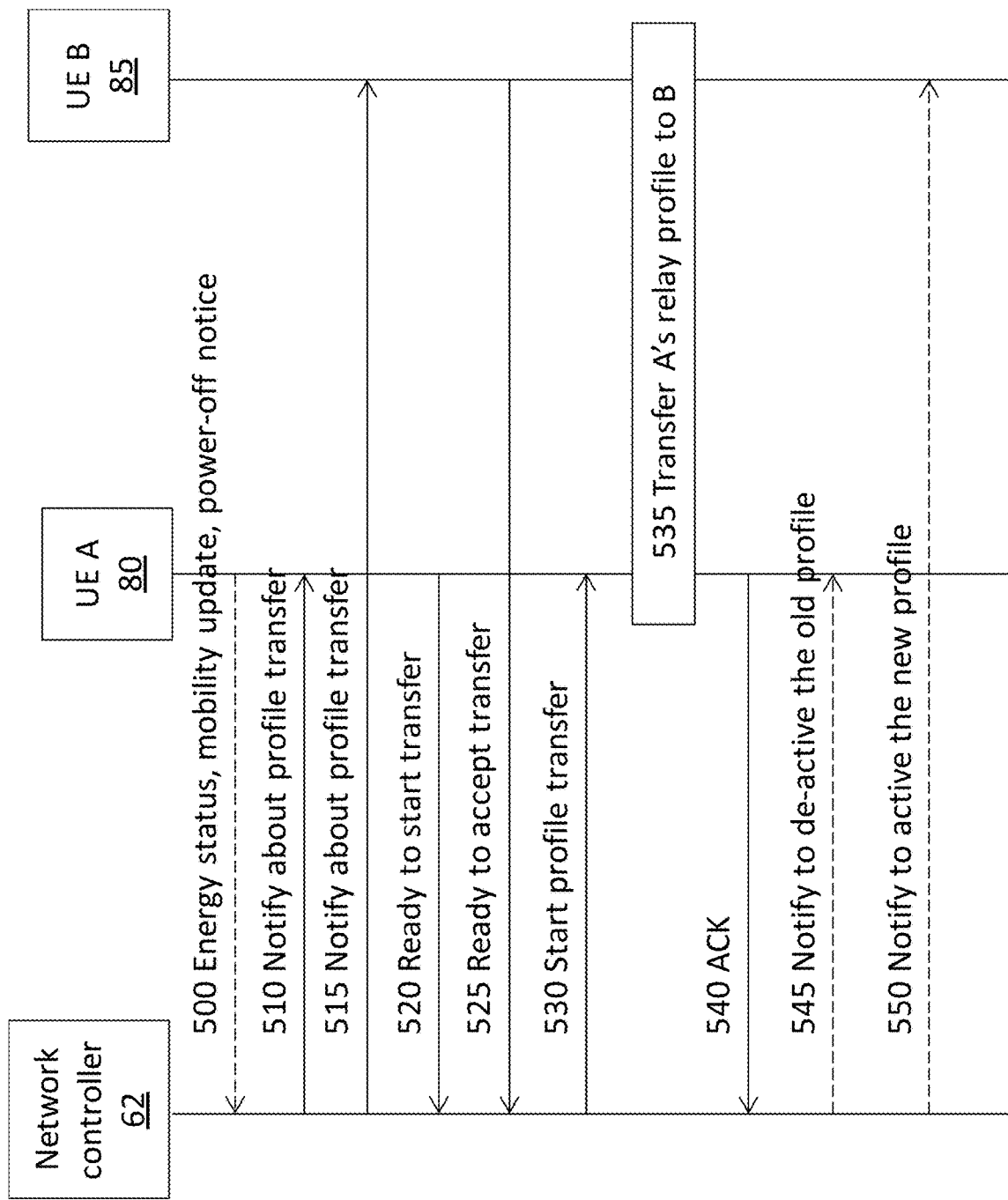
FIG. 5 is a signaling diagram illustrating the signaling for a network controller to inform the UEs of the relay service transfer, in an alternate embodiment.

Referring to FIG. 5, a signaling diagram is illustrated detailing the signaling for the network controller 62 informing the first relay UE A 80 and the second relay UE B 85 of the transfer, and a direct transfer of the relay profile 58 from the first relay UE A 80 to the second relay UE B 85, without assistance from the network controller 62. In an implementation, the network controller 62 directs the first relay UE A 80 to transfer the relay profile 58 to the second relay UE B 85, the first relay UE A 80 to cancel its relay service with the requesting device 60, and the second relay UE B 85 to generate and activate the associated relay profile 58 with the requesting device 60.

In the example of FIG. 5, in optional step 500, the network controller 62 may receive UE status information from at least one of the first relay UE A 80, the second relay UE B 85, and the requesting device 60. FIG. 5 only indicates the embodiment of the first relay UE A 80 providing UE status information. The UE status information may include, for instance, as energy status, mobility update, and/or a power off notice. In step 510, optionally based on the information provided in step 500, the network controller 62 transmits a notification to the first relay UE A 80 instructing the first relay UE A 80 to transfer the relay profile 58. In step 515 the network controller 62 transmits a notification to the second relay UE B 8 instructing the second relay UE B 85 to receive the relay profile 58. In steps 520 and 525 the first relay UE A 80 and the second relay UE B 85 transmit their readiness to conduct the profile transfer. In optional step 530 the network controller 62 may send to the first relay UE A 80 a notification instructing the first relay UE A 80 to start the profile transfer. In step 535, the first relay UE A 80 transfers the relay profile 58 to the second relay UE B 85. In step 540 the first relay UE A 80 transmits to the network controller 62 an acknowledgement confirming that the profile transfer has been completed. In some implementations, the acknowledgement may be transmitted to the network controller 62 by the second relay UE B 85. In optional step 545, the network controller 62 may notify the first relay UE A 80 that its relay service has been cancelled and instruct the first relay UE A 80 to de-activate the associated relay profile 58. In optional step 550, the network controller 62 may notify the second relay UE B 85 that its relay service has been activated and instruct the second relay UE B 85 to activate the associated relay profile 58 with the requesting device 60. In an alternative implementation, the profile transfer operation in step 535 may serve as notification to activate the relay service.

Figure 6:
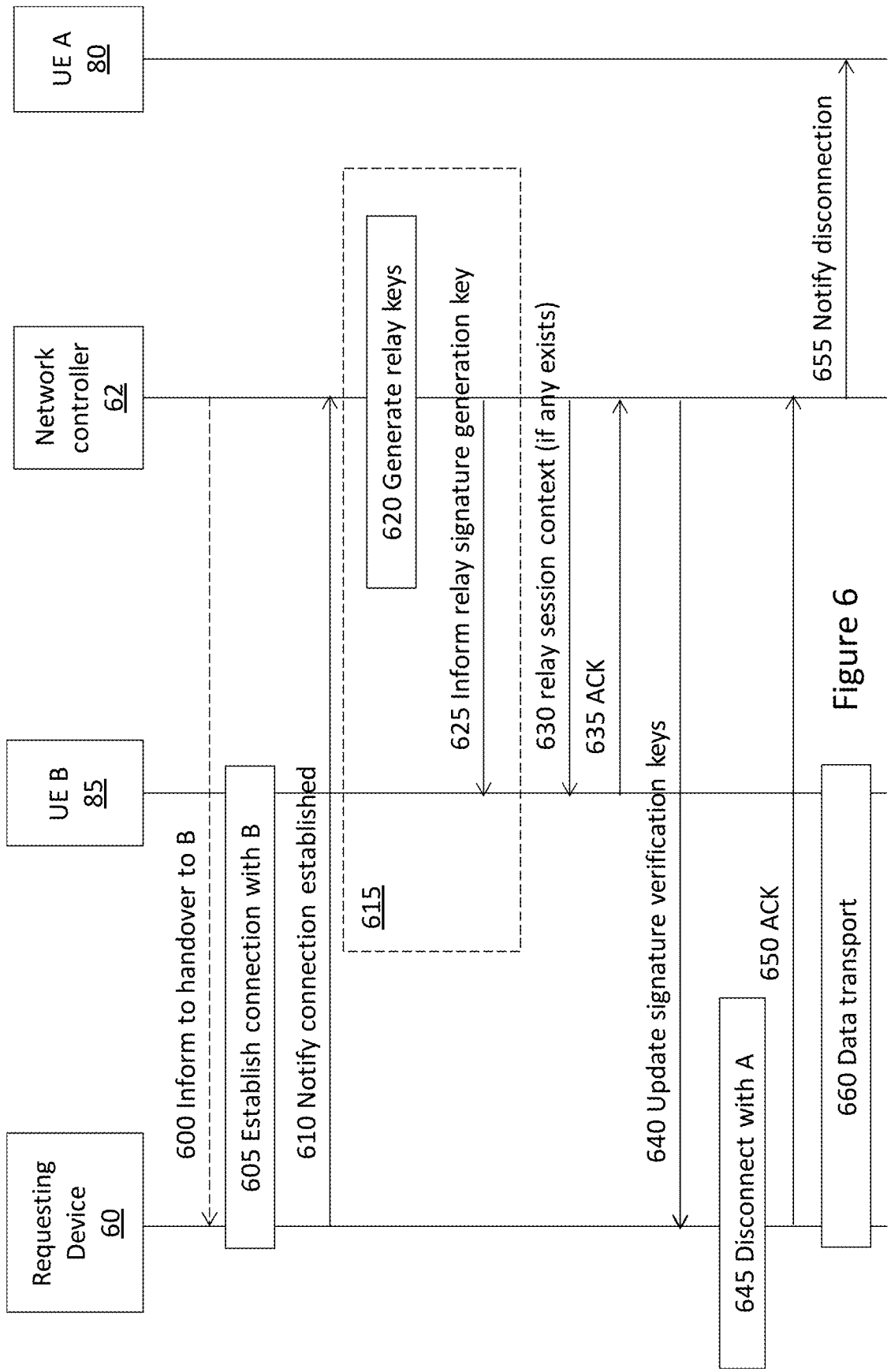
FIGS. 6 and 7 are signaling diagrams illustrating the signaling for embodiments of key management in a relay service transfer.

Referring to FIG. 6, a signaling diagram is illustrated detailing cryptographic key management by the network controller 62, for instance to update a cryptographic scheme after a relay service transfer. As indicated, in step 600 the network controller 62 may transmit to a requesting device 60 a direction to handover its connection from the first relay UE A 80 to the second relay UE B 85. In step 605 the connection between the requesting device 60 and the second relay UE B 85 is established. In step 610 the requesting device 60 notifies the network controller that the connection has been established. In step 615 security operations for the new connection may be conducted. In step 620 the network controller 62 may generate and in step 625 provide updated signature generation relay keys to the second relay UE B 85. In optional step 630, context information for the relay session may be transmitted by the network controller 62 to the second relay UE B 85. In step 635 the second relay UE B 85 may transmit an acknowledgement to the network controller 62. In optional step 640, the network controller may transmit to the requesting device 60 an update for the signature verification keys of the requesting device. The signature verification keys may be forwarded to the requesting device 60 by the first relay UE A 80, the second relay UE B 85, or the network controller 62 if a direct connection is available to the requesting device 60. In step 645 the requesting device 60 may then disconnect from the first relay UE A 80 and in step 660 utilize the relay service of the second relay UE B 85. In some implementations, in step 660 the network controller 62 may transmit to the first relay UE A 80 a notification that the relay session has been disconnected.

In general, network 50 may maintain a blacklist to control which relay UEs are assigned a relay profile 58, and which relay UEs are authorized to transmit data under the relay profile 58. In an implementation, the network controller 62 may issue updated signature keys after transferal of the relay profile 58 to terminate the ability for the first relay UE A 80 to connect with the requesting device 60.

Figure 7:
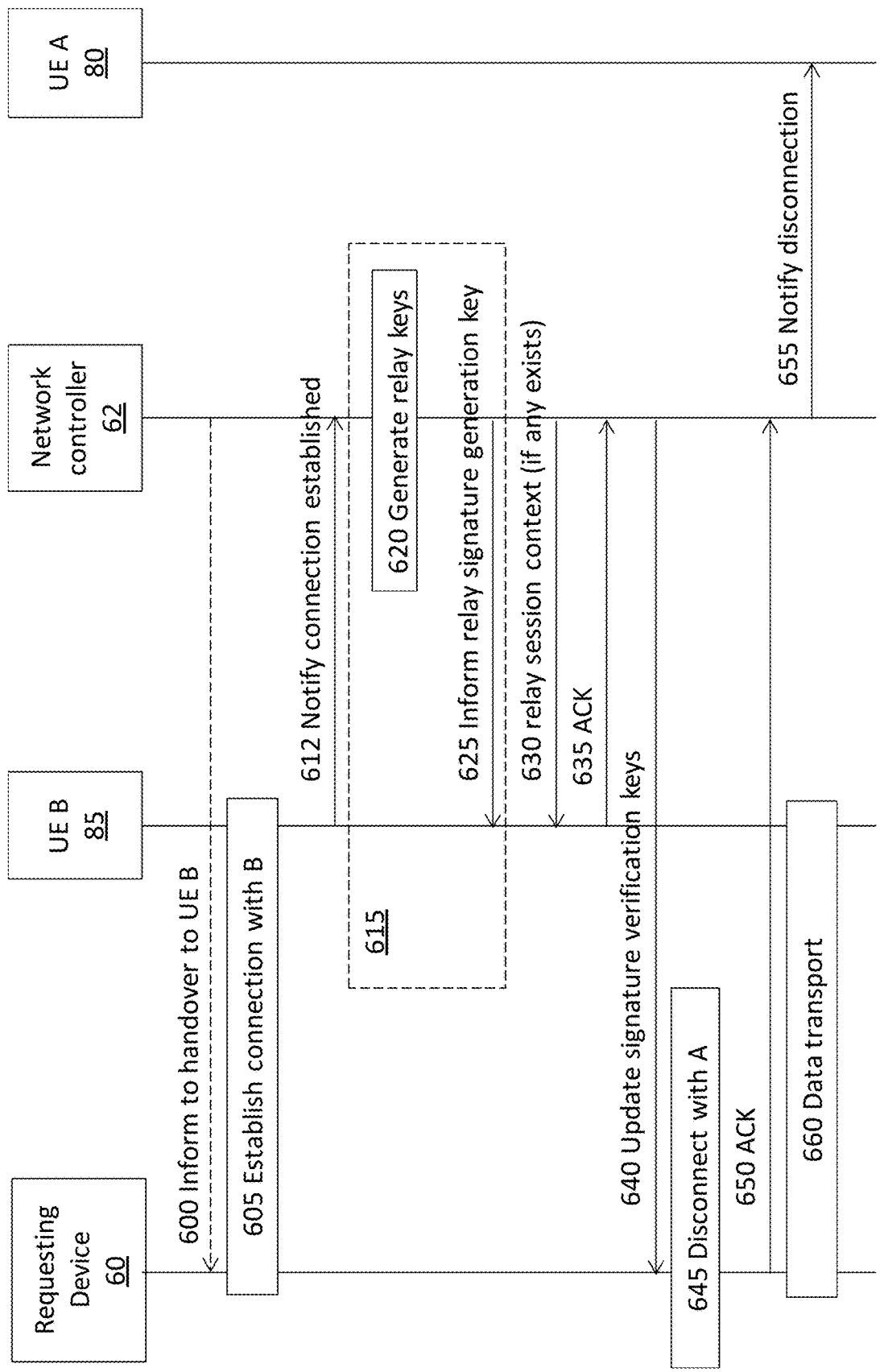

FIG. 7 illustrates a similar embodiment to FIG. 6, except that step 610 is not performed and instead in step 612 the second relay UE B 85 informs the network controller 62 that the requesting device 60 has established a connection with the second relay UE B 85.

Figure 8:
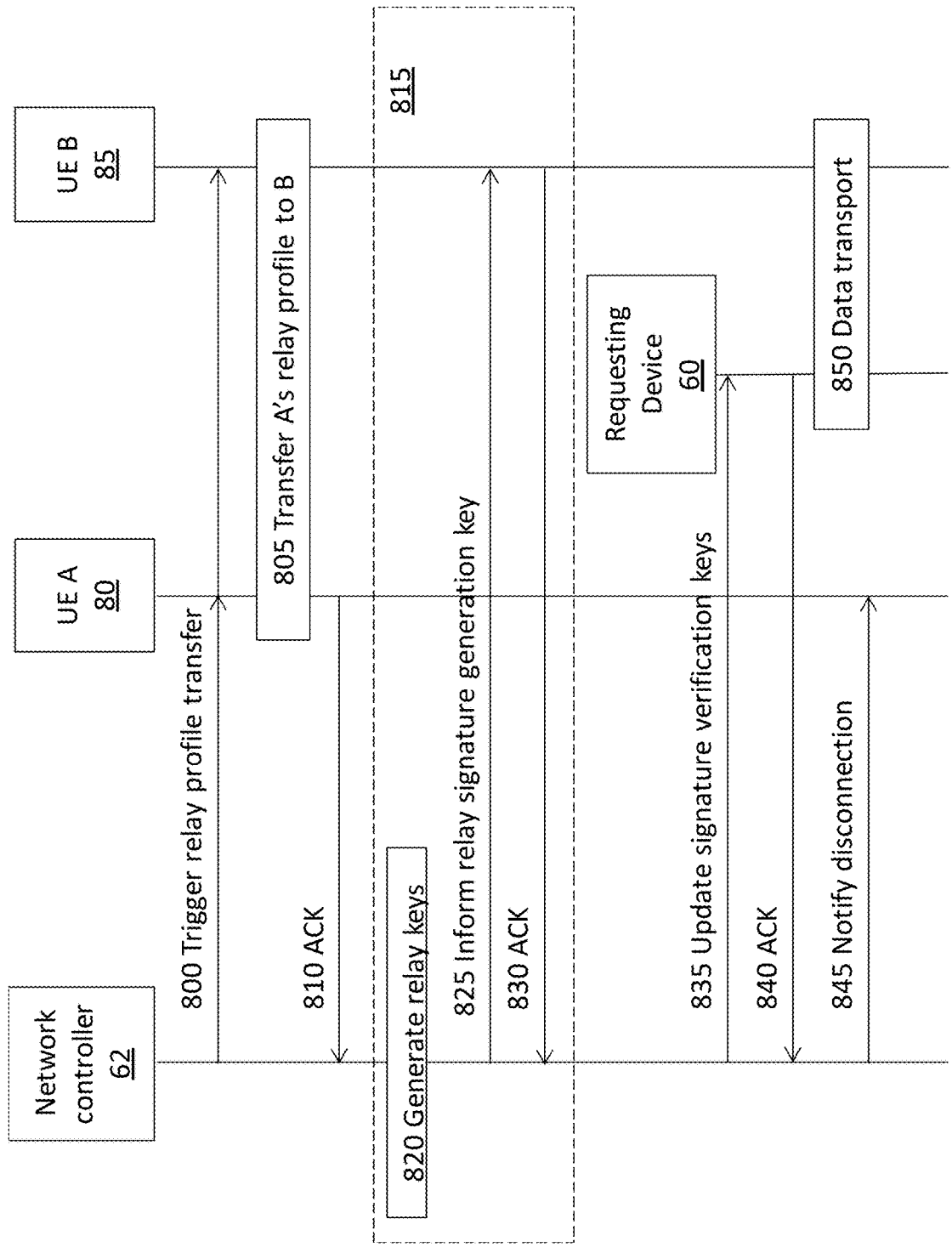
FIG. 8 is a signaling diagram illustrating the signaling for key management in a relay service transfer, in an embodiment.

Referring to FIG. 8, a signaling diagram is illustrated detailing an alternate cryptographic key management implementation. In the implementation, in step 800 the network controller 62 transmits to the first relay UE A 80 a trigger to initiate relay profile transfer to directly transfer the relay profile 58 to the second relay UE B 85. Accordingly, the network controller 62 may direct that the relay profile 58 be transferred, but in step 805 the transfer occurs directly between the first relay UE A 80 and the second relay UE B 85 either through a local direct communication modality, or to each other through the network 50. In step 810 at least one of the first relay UE A 80 and the second relay UE B 85 may transmit an acknowledgement to the network controller 62 confirming that the relay profile 58 has been successfully transferred.

In the implementation of FIG. 8, a security update operation 815 may be conducted. In step 820, the network controller 62 may generate new relay keys and in step 825 transmit the new relay keys to the second relay UE B 85. In step 830, the second relay UE B 85 transmits an acknowledgement confirming receipt of the new relay keys. If necessary, the network controller 62 may additionally update and transmit to the requesting device 60 updated signature verification keys. In step 840, the requesting device 60 may transmit to the network controller 62 an acknowledgement confirming receipt of the updated signature verification keys. As mentioned above, the updated signature verification keys may be supplied to the requesting device 60 by any of the first relay UE A 80, the second relay UE B 85, or the network controller 62 depending upon circumstances. In step 850 the requesting device 60 and the second relay device 85 may start exchanging data under the transferred relay profile 58. In optional step 845 the network controller 62 may additionally transmit to the first relay UE A 80 a notification of disconnection.

Figure 9:
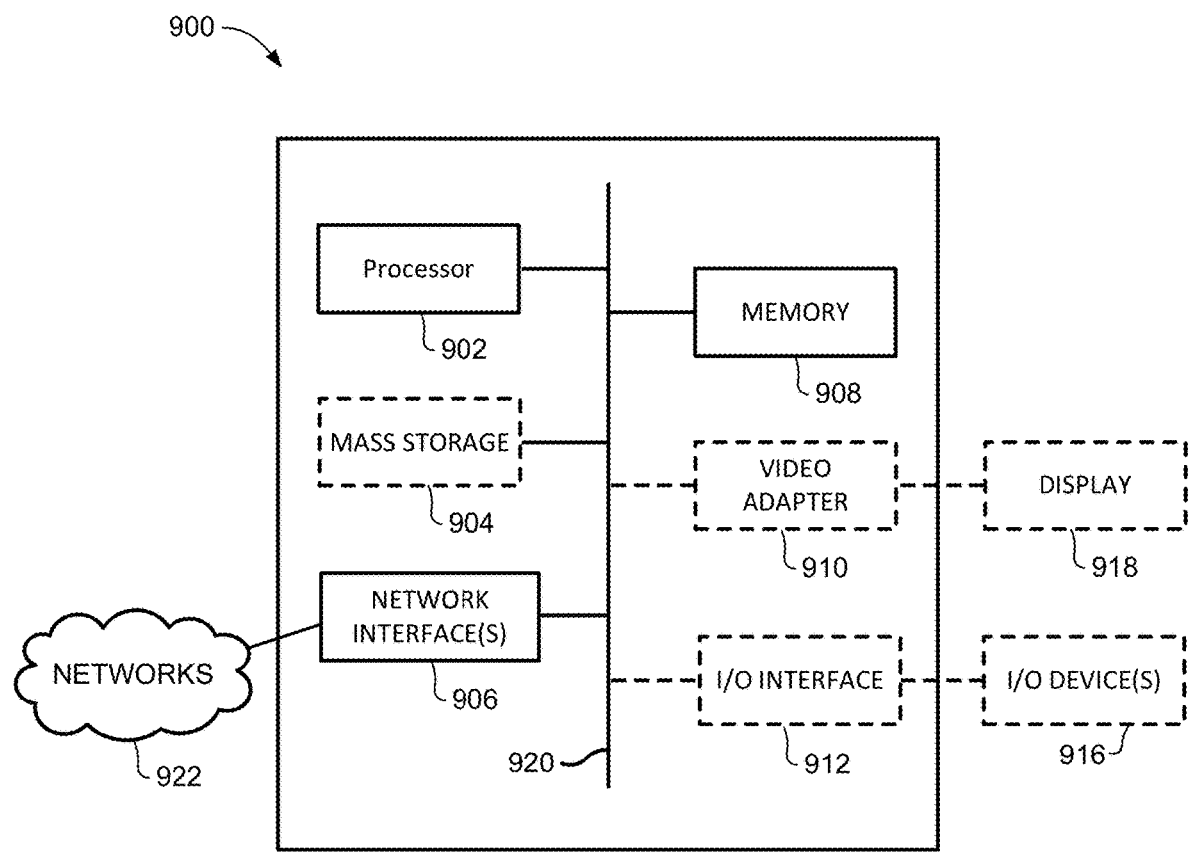
FIG. 9 is a block diagram illustrating an embodiment of a computing system.

FIG. 9 is a block diagram of a computing system 900 that may be used for implementing the UE and application servers to perform the methods described herein.

Specific devices may utilize all of the components shown or only a subset of the components, and levels of integration may vary from device to device. Furthermore, a device may contain multiple instances of a component, such as multiple processing units, processors, memories, transmitters, receivers, etc. The computing system 900 includes a processor 902 such as a central processing unit (CPU) which may comprise any type of electronic data processor, and may include one or more cores or processing elements. The computing system 900 may further include a bus 920 and a memory 908, and may optionally also include a mass storage device 904, a video adapter 910, and an I/O interface 912 (shown in dashed lines). The computing system 900 may further include one or more network interface(s) 906 for connecting the computing system 900 to communication networks 922. In some implementations, the network interface(s) 906 may comprise wireless network interfaces. In some implementations, the network interface(s) 906 may comprise optical or electrical wired network interfaces.

The memory 908 may comprise any type of non-transitory system memory such as static random access memory (SRAM), dynamic random access memory (DRAM), synchronous DRAM (SDRAM), read-only memory (ROM), or a combination thereof. In an embodiment, the memory 908 may include ROM for use at boot-up, and DRAM for program and data storage for use while executing programs. The bus 920 may be one or more of any type of several bus architectures including a memory bus or memory controller, a peripheral bus, or a video bus.

The mass storage 904 may comprise any type of non-transitory storage device configured to store data, programs, and other information and to make the data, programs, and other information accessible via the bus 920. The mass storage 904 may comprise, for example, one or more of a solid state drive, hard disk drive, a magnetic disk drive, or an optical disk drive.

The video adapter 910 and the I/O interface 912 provide optional interfaces to couple external input and output devices to the processing unit 902. Examples of input and output devices include a display 918 coupled to the video adapter 910 and an I/O device 916 such as a touch-screen coupled to the I/O interface 912. Other devices may be coupled to the processing unit 902, and additional or fewer interfaces may be utilized. For example, a serial interface such as Universal Serial Bus (USB) (not shown) may be used to provide an interface for an external device. Alternatively, the computing system 900 may rely upon the network interface(s) 906 for connection to available mass storage(s), video adapter(s) 610, and I/O interface(s) 912 available on the networks 922.

In an embodiment, a system is provided for exchanging relay data with a network. The system may include: a requesting device; and, a relay UE operable to: receive a transferable relay profile associated with the requesting device, establish a connection with the requesting device for exchanging the relay data between the requesting device and the relay UE based on the transferable relay profile; and, establish a connection with the network for exchanging the relay data between the relay UE and the network based on the transferable relay profile.

In an implementation, the system further comprises a second relay UE operable to: receive the transferable relay profile associated with the requesting device; establish a connection with the requesting device for exchanging the relay data between the requesting device and the second relay UE based on the transferable relay profile; and, establish a connection with the network for exchanging the relay data between the second relay UE and the network based on the transferable relay profile. In some implementations, after the second relay UE receives the transferable relay profile and establishes the connection with the requesting device the relay UE is no longer operable to exchange the relay data between the network and the requesting device.

In an implementation, the relay UE is further operable to establish a UE profile the connection between the relay UE and the network based on the UE profile. In an implementation, the connection between the relay UE and the network is defined by a UE profile. The UE profile may be transferable with the transferable relay profile, or may be independent from the relay profile. In an implementation, the transferable relay profile may additionally comprise a UE profile, and, the system may be further operative to establish an updated device profile for the second relay UE and to establish the connection between the second relay UE and the network using the updated UE profile. In an implementation, the system may further include a network controller operative to transmit the transferable relay profile to the relay UE. In some implementations, the network controller may be operative to transmit the transferable relay profile to the second relay UE. In some implementations, the relay device is operative to transmit the transferable relay profile to the second relay UE.

According to embodiments of the present invention, there is provided a method for a relay UE to exchange relay data with a network. The method comprises receiving, at a relay, a transferable relay profile associated with a requesting device; establishing a connection with the requesting device for exchanging the relay data between the requesting device and the relay UE based on the transferable relay profile; and, establishing a connection with the network for exchanging the relay data between the relay UE and the network.

In implementations of this first embodiment, the method can further include the steps of receiving signature generation keys; and, using the received signature generation keys with the received transferable relay profile to establish the connection with the requesting device. In another implementation, the method can further comprise receiving signature generation keys; and, using the received signature generation keys with the received transferable relay profile to establish the connection with the network. In another implementation, the connection between the relay UE and the network is based on the transferable relay profile. In a further implementation, the connection between the relay UE and the network is based on a UE profile.

In a second embodiment, there is a provided a UE for carrying out the method of the above embodiment. The UE comprises a processor, a radio access network interface, and a non-transitory memory for storing instructions. When the processor executes the stored instructions, it causes the UE to: receive a transferable relay profile associated with a requesting device; establish a connection with the requesting device for exchanging the relay data between the requesting device and the relay UE based on the transferable relay profile; and, establish a connection with the network for exchanging the relay data between the relay UE and the network.

In an implementation of this second embodiment the non-transitory memory stores further instructions that when executed cause the UE to: receive signature generation keys; and, establish the connection with the requesting device using the received signature generation keys with the received transferable relay profile. In another implementation, the non-transitory memory stores further instructions that when executed cause the UE to: receive signature generation keys; and, establish the connection with the network using the received signature generation keys with the received transferable relay profile. In a further implementation the connection between the relay UE and the network is based on the transferable relay profile. In another implementation the connection between the relay UE and the network is based on a UE profile.

Unless defined otherwise, all technical and scientific terms used herein have the same meaning as commonly understood by one of ordinary skill in the art to which this invention belongs.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A method for exchanging data with a network comprising:
   receiving, at a network controller, from a relay UE, a transferable relay profile, wherein the transferable relay profile defines a relay service for relaying communications received from the requesting device to the network and for relaying communications received from the network to the requesting device;
   transmitting the transferable relay profile to a second relay UE, to enable the second relay UE to establish a connection between the second relay UE and the requesting device and to provide the relay service in accordance with the relay profile; and
   notifying the relay UE that the relay service at the relay UE is cancelled and instructing the relay UE to de-activate the relay profile.

2. The method of claim 1, further comprising transmitting an instruction to the relay UE to start a transfer of the relay profile prior to receiving the transferable relay profile.

3. The method of claim 2, further comprising wherein transmitting the transferable relay profile is performed in response to a relay transfer decision determined in accordance with status information associated with at least one of the relay UE, the second relay UE, and the requesting device.

4. The method of claim 1, further comprising:
   generating signature generation keys; and,
   transmitting the generated signature generation keys to the second relay UE for use with the transferable relay profile.

5. The method of claim 1, further comprising:
   generating updated signature verification keys; and,
   transmitting the updated signature verification keys to the requesting device.

6. The method of claim 1, wherein the relay profile includes a set of parameters characterizing a connection with the requesting device.

7. The method of claim 6, wherein the set of parameters characterize one or more of: how the relay UE or the second relay UE provides service to the requesting device; the physical connection between the relay UE or the second relay UE and the requesting device; a virtual identifier; a virtual security credential; and information for use in connecting to the requesting device.

8. The method of claim 1, wherein the relay profile includes information relating to services supported by the network in association with the relay service.

9. The method of claim 1, wherein the relay profile includes a transferable authentication credential for allowing the second relay UE, when in possession of the relay profile, to connect to the network under auspices of the relay UE.

10. A method for a relay UE to exchange relay data with a network comprising:
 establishing, at the relay UE, a relay connection between a requesting device and the network using a transferable relay profile, wherein the transferable relay profile defines a relay service for relaying communications received from the requesting device to the network and for relaying communications received from the network to the requesting device;
 receiving, at the relay UE, an instruction to transfer the transferable relay profile; and,
 transmitting, from the relay UE, the transferable relay profile, to enable a second relay UE to establish the relay connection between the second relay UE and the requesting device and to provide the relay service in accordance with the relay profile; and
 cancelling the relay service at the relay UE upon transmitting the transferable relay profile.

11. The method of claim 10 wherein the transferable relay profile is transmitted to one of the second relay UE and a network controller.

12. The method of claim 10, wherein the instruction is received from the requesting device or a network controller.

13. A network controller available on a network, the network controller comprising:
 a processor;
 a network interface;
 a non-transitory memory for storing instructions that when executed by the processor cause the network controller, to:
  responsive to receipt from a relay UE a transferable relay profile, transmit the transferable relay profile to a second relay UE to enable the second relay UE to establish a connection between the second relay UE and the requesting device and to provide the relay service in accordance with the relay profile, wherein the transferable relay profile defines a relay service for relaying communications received from the requesting device to the network and for relaying communications received from the network to the requesting device; and
  notify the relay UE that the relay service at the relay UE is cancelled and instruct the relay UE to de-activate the relay profile.

14. The network controller of claim 13, wherein the non-transitory memory stores further instructions that when executed cause the network controller to:
 transmit to the relay UE an instruction to start relay profile transfer, prior to receiving the transferable relay profile.

15. The network controller of claim 14, wherein the non-transitory memory stores further instructions that when executed cause the network controller to:
 before the transmitting the instruction to start relay profile transfer, monitor UE status information of at least one of the relay UE, the second relay UE, and the requesting device; and, to transmit the instruction to start relay profile transfer based on the monitored UE status information.

16. The network controller of claim 13, wherein the non-transitory memory stores further instructions that when executed cause the network controller to:
 generate signature generation keys; and,
 transmit the generated signature generation keys to the second relay UE for use with the transferable relay profile.

17. The network controller of claim 13, wherein the non-transitory memory stores further instructions that when executed cause the network controller to:
 generate updated signature verification keys; and,
 transmit the updated signature verification keys to the requesting device.

18. A User Equipment (UE) comprising:
 a processor
 a radio access network interface;
 a non-transitory memory for storing instructions that when executed by the processor cause the UE to:
  establish at the UE a relay connection between a requesting device and the network using a transferable relay profile, wherein the transferable relay profile defines a relay service for relaying communications received from the requesting device to the network and for relaying communications received from the network to the requesting device;
  receive at the UE an instruction to transfer the transferable relay profile; and,
  transmit from the UE the transferable relay profile to a second relay UE, to enable a second relay UE to establish a connection between the second relay UE and the requesting device and to provide the relay service in accordance with the relay profile; and
  cancel the relay service at the relay UE upon transmitting the transferable relay profile.

19. The UE of claim 18, wherein the transferable relay profile is transmitted to one of the second relay UE and a network controller.

20. The UE of claim 18, wherein the instruction is received from the requesting device or a network controller.

* * * * *